July 3, 1934.　　　　W. D. ARCHEA　　　　1,965,210
MACHINE TOOL
Filed July 24, 1930　　　4 Sheets-Sheet 2

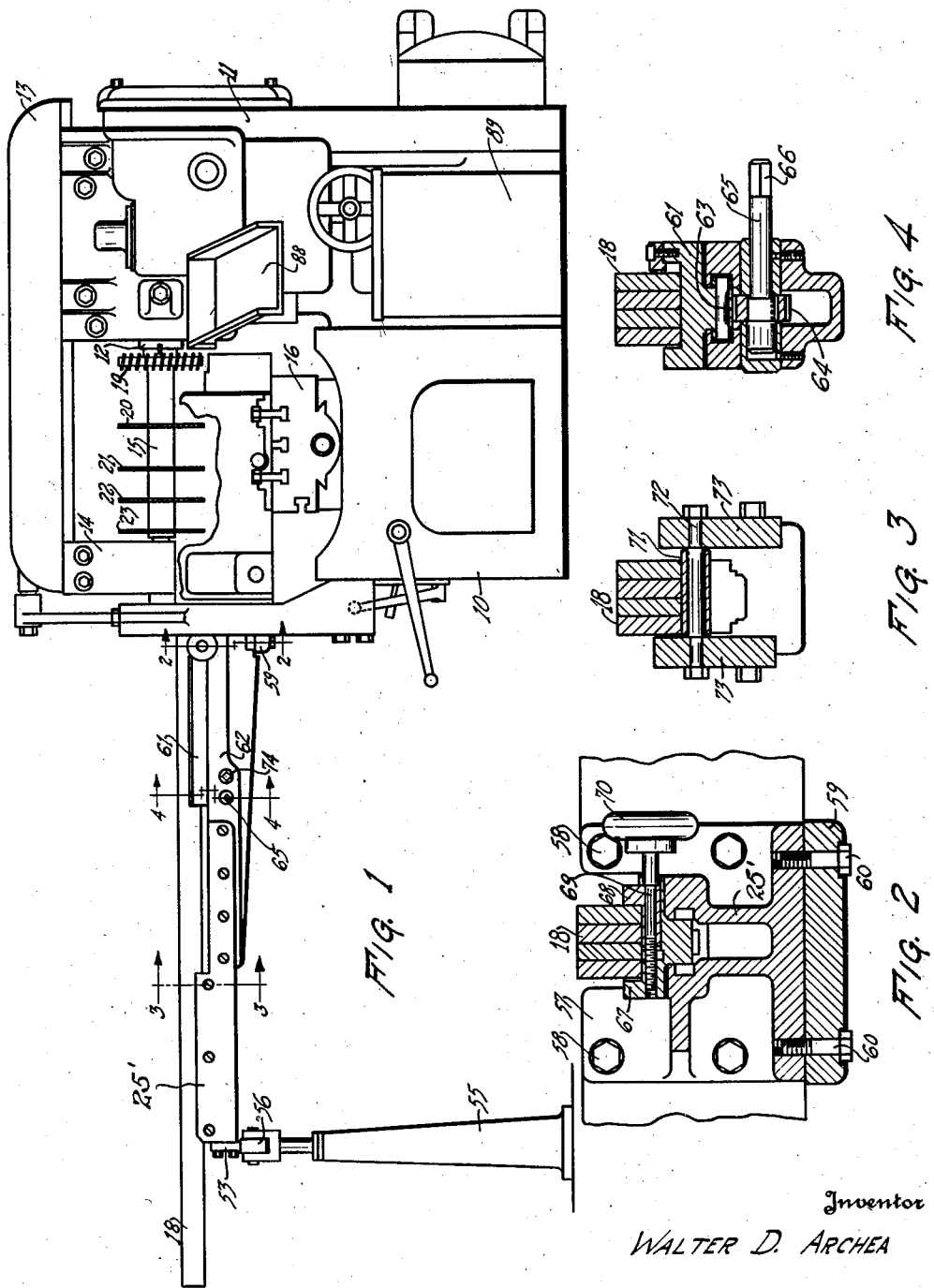

Inventor
WALTER D. ARCHEA
By　H. K. Parsons
　　　Attorney

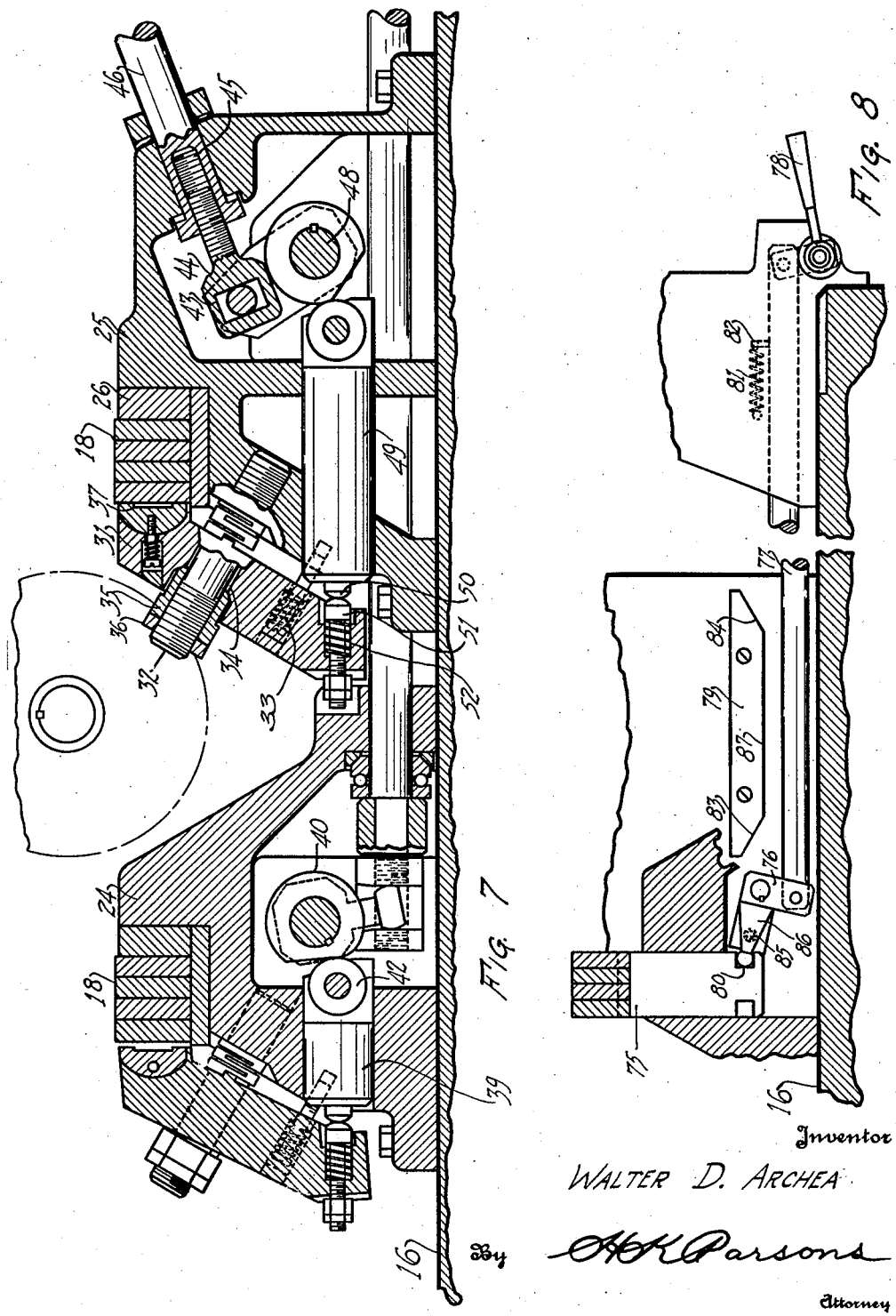

July 3, 1934.  W. D. ARCHEA  1,965,210
MACHINE TOOL
Filed July 24, 1930  4 Sheets-Sheet 4
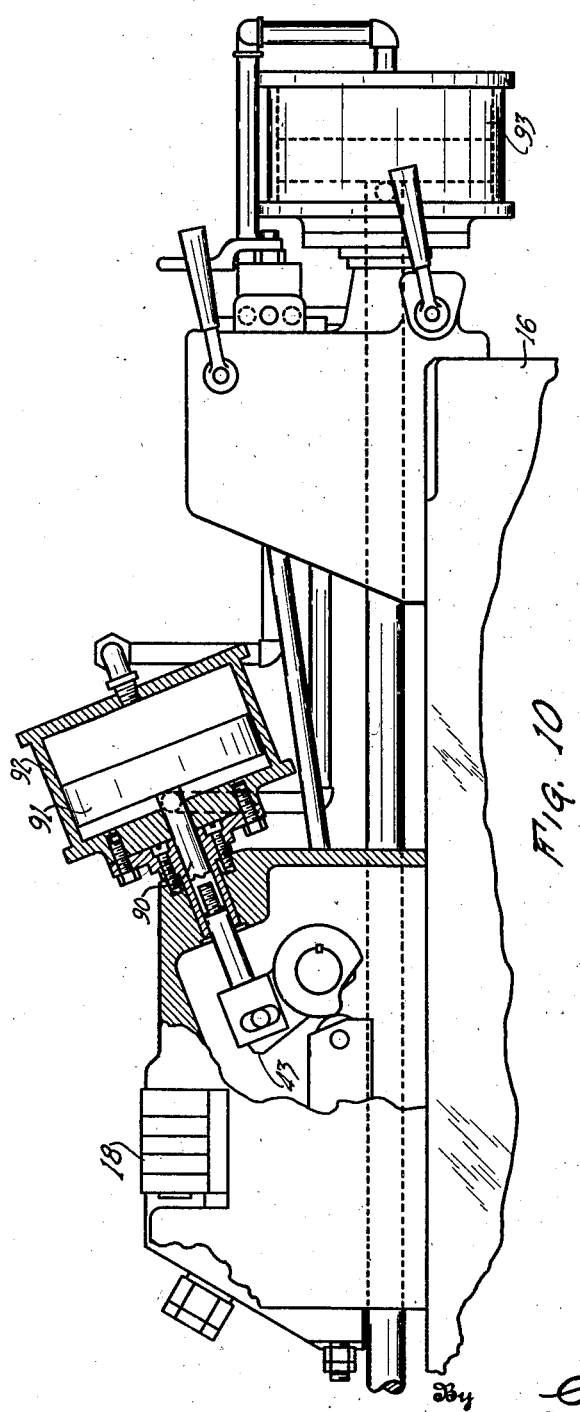
Inventor
WALTER D. ARCHEA
By AHKParsons
Attorney Patented July 3, 1934

1,965,210

UNITED STATES PATENT OFFICE 1,965,210

MACHINE TOOL

Walter D. Archea, Norwood, Ohio, assignor to The Cincinnati Milling Machine Company, Cincinnati, Ohio, a corporation of Ohio Application July 24, 1930, Serial No. 470,421

1 Claim. (Cl. 29—70)

This invention relates to milling machines and more particularly to an improved cutting-off machine.

One of the objects of this invention is the provision of an improved machine for simultaneously severing a plurality of pieces from each one of a plurality of bars of stock.

A further object of this invention is the provision, in a machine having a reciprocating work table, of an auxiliary support movable with the table to act as a conveyor for feeding work into the machine.

An additional object of this invention is the provision of a cutting-off machine for bar stock having means for squaring the ends of the stock and additional means for severing a plurality of pieces of various lengths therefrom in a single operation.

Other objects and advantages of the present invention should be readily apparent by reference to the following specification considered in conjunction with the accompanying drawings illustrative of one embodiment thereof but it will be understood that any modifications may be made in the specific structural details hereinafter disclosed within the scope of the appended claim without departing from or exceeding the spirit of the invention.

Referring to the drawings in which like reference numerals indicate like parts:

Figure 1 is an elevation of a machine embodying the principles of this invention.

Figure 2 is a section taken on the line 2—2 of Figure 1.

Figure 3 is a section taken on the line 3—3 of Figure 1.

Figure 4 is a section as viewed on the line 4—4 of Figure 1.

Figure 7 is a detail section through a pair of work holders showing the work clamping mechanism.

Figure 8 is a detail of the stop mechanism.

Figure 10 is a modified form of a work holder.

Figure 5:
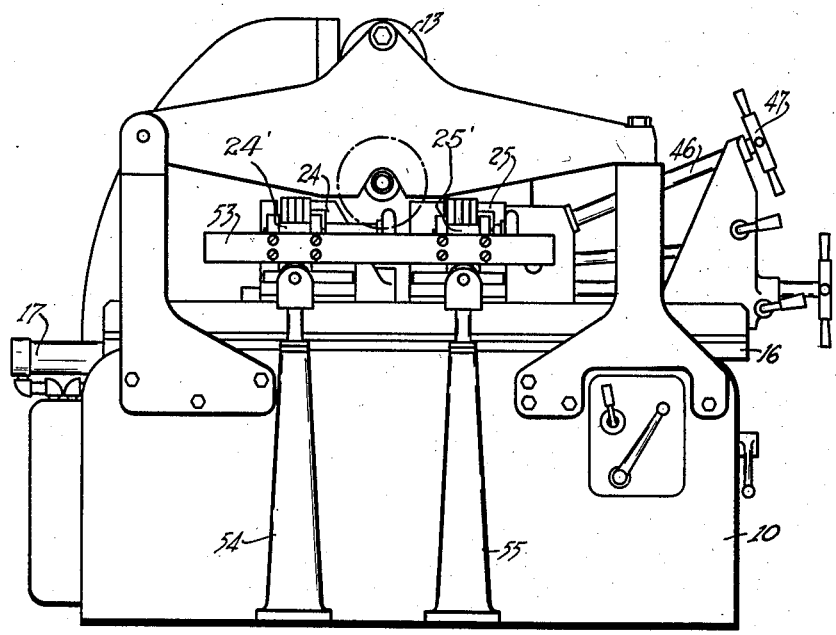
Figure 5 is a side view of the machine as viewed from the left in Figure 1.

In the drawings the reference numeral 10 indicates the base of the machine having adjacent thereto an upright portion or column 11 which supports a cutter spindle 12. An overarm 13 is also carried by the column and has a depending support 14 attached to the free end thereof for supporting the outboard end of a cutter arbor 15 attached to the spindle 12 for rotation therewith.

A work table 16 is slidably mounted upon the base 10 and adapted to be reciprocated by power means, indicated generally by the reference numeral 17 which in the present instance comprises hydraulic means.

The present machine is adapted to mill or cut simultaneously a plurality of pieces of bar stock, such as 18, into short pieces of a length determined by the spacing of the cutters on the cutter arbor 15. Since the ends of the stock are apt to be rough a milling cutter 19 is provided on the arbor for squaring up the ends of the stock while the spaced cutters 20, 21, 22 and 23 are simultaneously operating upon the bar to sever a plurality of pieces therefrom. After the stock has been squared up and the initial group of pieces cut off the work is moved into the machine for the severance therefrom of another group of pieces. This time the end of the work abuts a stop which is in the plane of the cutter 19 thereby preventing operation of this cutter as the cutter 23 in cutting off the last piece during the previous operation thereby automatically left the end of the stock square.

Figures 6, 9:
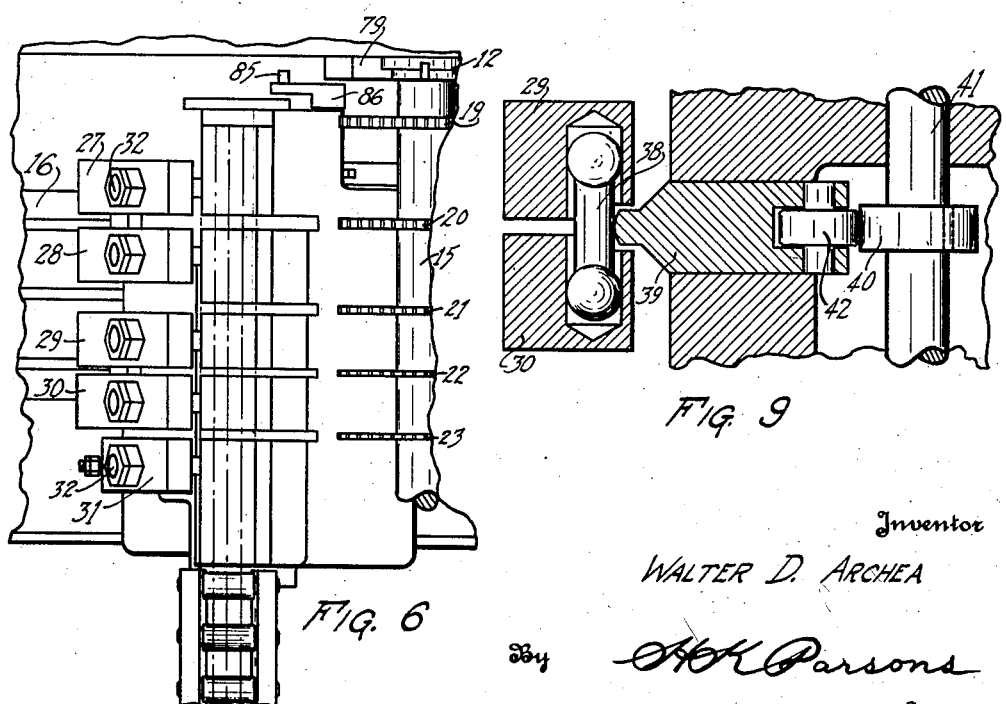
Figure 6 is a plan view of one of the work holders showing the relation of the clamping elements to the cutters.
Figure 9 is a detail of an equalizer clamp.

Since the operation of this machine is to be continuous, provision has been made for two groups of work pieces whereby during the operation of the cutters upon one group, the severed pieces of the second group may be removed and the work fed into the machine in preparation for a succeeding operation. A pair of work holders have, therefore, been provided which are indicated generally by the reference numerals 24 and 25 in Figure 7. Since each work holder is the same a description of one is thought to be sufficient. The work holder 25 is provided with a fixed jaw 26 and a plurality of movable jaws 27, 28, 29, 30 and 31, as shown in Figure 6. Each of the jaws are mounted upon a pivot pin 32 which is threaded into the casting of the work holder at an angle thereto and has a heavy spring member 33 mounted thereon and interposed between the movable jaw and the casting of the work holder. Each movable jaw, as for instance, 31 has a large bore 34 for receiving the member 32, which is slightly smaller than the bore to permit the member 31 to pivot slightly about the pin. An adjusting nut 35 and a locking nut 36 are threaded on the end of the member 32 and serve as a fulcrum for the member 31. An automatic adjusting face plate 37 is attached to the end of each jaw and is adapted to adjust itself to the plane of the work upon clamping the same.

Since the numerous work pieces as they are severed from the bar stock would become loose and apt to bind against the cutters upon their withdrawal, means have been provided to insure clamping of each section of the bar between each pair of cutters before cutting in order to prevent damage or breakage of the cutters. To insure that each clamp firmly grips its particular section, the clamps have been divided up into two groups, one group represented by the jaws 27 and 28, and the other group, the three remaining jaws, 29 to 31 inclusive. The jaws 27 and 28 are actuated by an equalizer member 38, shown more particularly in Figure 9, which is engaged midway of its length by the member 39. This member is reciprocated by the action of a cam 40 mounted on the shaft 41 engaging the roller 42 journaled in the end of the member 39. Rotation of the shaft 41 is effected by a lever, such as 43, keyed thereto and pivotally connected at its opposite end to the member 44 which has a threaded end engaging the threaded socket 45 in the end of the shaft 46 journaled in the member 25 but held against longitudinal movement with respect thereto. A handle 47 is fixed to the end of the shaft 46 for effecting rotation thereof, movement of which in one direction will effect clamping of the jaws 27 and 28 and movement in the other direction will effect unclamping aided by the spring member 33.

The jaws 29 and 30 are operated in a similar manner as that just described for the jaws 27 and 28 but by a separate cam shaft 48.

The actuation of the jaw 31 is effected by a separate plunger 49 having a hardened head 50 which engages a spring pressed plunger 51 mounted in the lower end of the member 31. The spring 52, which is interposed between the head of the plunger 51 and the jaw 31, acts as an equalizing member to insure clamping of the jaw 31 independent of the clamping of the members 29 and 30.

Individual work supports 24' and 25' having stock carriers are provided for supplying each work holder with stock and both are secured to the work table for movement therewith. The outboard ends of the work supports are connected together by the member 53, as shown in Figures 1 and 5, which also serves as a guide rail, it being supported by spaced stanchions 54 and 55 arranged in a line parallel to the direction of movement of the table having rollers 56 journaled in the upper end of each. Each work support is attached to the work table by means shown more particularly in Figure 2. The end of each work support is provided with a vertical flange 57 by which it is bolted to the side of the work holder by bolts 58 and secured to a bracket 59 by bolts 60. Each work support is also provided with a stock carrier 61 which is slidably mounted upon the frame 62 and adapted to be moved therealong by means of a rack 63 formed in the under side of the carrier, which is engaged by a pinion 64 keyed to the stub shaft 65 journaled in the frame 62. The shaft 65 has a squared end 66 which may be engaged by a removable operating handle. Since the carrier 61 has limited movement on the frame, it has been provided with means for successively gripping and moving the stock inward, which may take the form, as shown in Figure 2, of a fixed jaw 67 and a movable vise jaw 68 operated by a clamping screw 69 having the handle 70 attached to the end thereof. Since the bar stock used is comparatively heavy, rollers have been provided, at spaced intervals, such as 71 shown in Figure 3, mounted upon the stub shafts 72 journaled in the sides 73 of the work support.

The operation of the carrier is as follows:
Referring to Figure 1, the carrier is shown in its extreme position to the right and after the stock has been clamped in the work holder 25 the clamping screw 70 is released and the carrier moved to an extreme left position by the rotation of shaft 65 causing pinion 64 to reciprocate the carrier through its rack 63. The carrier in this case moves relative to the stock since the stock is being held by the work holder. This permits the carrier to obtain a new grip on the work as by tightening the locking screw 69 after which the pinion 64 is rotated in a reverse direction to effect movement of the work into the machine. In order to centralize the operating levers of the machine both of the work supports are arranged to be operated from a single position and as shown in Figure 1, a second operating shaft 74 is arranged adjacent to the shaft 65 for reciprocating the carrier in the remote support.

In order to properly position the work with respect to the cutters a stop has been provided, shown more particularly in Figure 8. A sliding stop member 75 is reciprocably mounted in the end of the work holder bracket and has its inner face in the same plane as the cutting face of the milling cutter 19. A bell crank 76 is pivotally mounted in the end of the work holder and has a rounded head on one arm engaging a slot 80 in the stop 75 so that upon rotation of the bell crank by means of the connecting rod 77 operated by the handle 78, the stop will be moved up or down. A spring 81 attached to a fixed part of the machine engages a pin 82 fixed to the connecting rod and tends to hold the stop in a raised position. Since the stop 75 is in the same plane as the cutter 19 and carried by the movable table it is apparent that upon reciprocation of the work table interference between these two parts would result and, therefore, means have been provided for automatically lowering the stop out of the path of the cutter 19 upon movement of the work table toward the cutter. This is effected by providing a cam bar 79 upon the face of the spindle carrier having cam faces 83 and 84 which are adapted to engage a pin 85 projecting from the outside face of the lever arm 86 of the bell crank 76. It should be apparent by reference to Figure 8 that when the pin 85 engages the face 83 the stop member 75 will be moved downward and the surface 87 will hold the stop down until it has passed the cutter.

While one group of work pieces is being operated upon the parts which have been severed from the other group are removed from the machine by lowering the stop 75 and feeding the bars 18 inward. This feeding movement causes the severed pieces to drop into the chute 88 from which they slide by gravity into the container 89. It is understood that a separate chute and container are provided for each work holder.

A modified form of work holder is shown in Figure 10 in which the clamping jaws are pneumatically operated. In this case the lever, such as 43, is connected to the end of a piston rod 90 attached to a piston 91 reciprocably mounted in a cylinder 92. A pair of such cylinders are mounted side by side for operating the clamping jaws of one work holder while another pair of cylinders 93 are provided for operating the jaws of the other work holder.

A machine has thus been provided which is capable of handling exceedingly long bars of stock, reciprocating them laterally of a cutting device to sequentially sever short pieces therefrom in predetermined lengths together with means for feeding the stock into the machine and a container for receiving the work pieces as they are ejected therefrom.

That which is claimed is:

A cutting-off machine having a support, a cutting element carried by the support, a power reciprocable table carried by the support for movement transversely of the cutting element, said table being adjacent the front wall of said support, work supports projecting laterally from the table beyond said front wall and on opposite sides of the cutting element, means to support the outboard end of the work support in the plane of the table, said work supports being power actuable with the table laterally of the cutting elements to alternately present the stock in the respective work supports to the cutting element, and means to feed the bar stock in one work support transversely of the table during operation of the cutting element on the stock in the other work support.

WALTER D. ARCHEA.